(12) United States Patent
Kondrad et al.

(10) Patent No.: US 10,384,566 B2
(45) Date of Patent: Aug. 20, 2019

(54) VEHICLE SEAT ASSEMBLY

(71) Applicant: Ford Global Technologies, LLC, Dearborn, MI (US)

(72) Inventors: Marcos Silva Kondrad, Macomb Township, MI (US); Johnathan Andrew Line, Northville, MI (US); S. M. Akbar Berry, Windsor (CA); Kevin Wayne Preuss, Berkley, MI (US); Jimmy Moua, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/834,756

(22) Filed: Dec. 7, 2017

(65) Prior Publication Data

US 2019/0061561 A1    Feb. 28, 2019

Related U.S. Application Data

(60) Provisional application No. 62/550,101, filed on Aug. 25, 2017.

(51) Int. Cl.
| | | |
|---|---|---|
| *B60N 2/22* | (2006.01) | |
| *B60N 2/23* | (2006.01) | |
| *B60R 22/00* | (2006.01) | |
| *B60N 2/02* | (2006.01) | |
| *B60R 22/34* | (2006.01) | |
| *B60N 2/00* | (2006.01) | |
| *B60N 2/879* | (2018.01) | |
| *B60R 22/26* | (2006.01) | |
| *B60N 2/005* | (2006.01) | |

(52) U.S. Cl.
CPC .......... *B60N 2/0244* (2013.01); *B60N 2/002* (2013.01); *B60N 2/0232* (2013.01); *B60N 2/22* (2013.01); *B60N 2/879* (2018.02); *B60R 22/26* (2013.01); *B60R 22/34* (2013.01); *B60N 2/005* (2013.01); *B60N 2002/0236* (2013.01); *B60N 2002/0268* (2013.01); *B60N 2002/0272* (2013.01); *B60N 2002/2204* (2013.01); *B60R 2022/3402* (2013.01)

(58) Field of Classification Search
CPC ...... B60N 2/005; B60N 2/0244; B60N 2/879; B60N 2/002; B60N 2/0232; B60N 2/22; B60N 22/26; B60R 22/26
USPC ... 297/216.1, 216.12, 216.13, 216.14, 284.3, 297/353, 410, 487, 488, 118, 341, 342, 297/343
See application file for complete search history.

(56) References Cited

U.S. PATENT DOCUMENTS

| | | | | |
|---|---|---|---|---|
| 2,320,614 A | * | 6/1943 | Kleine ..................... | B60N 2/34 297/118 X |
| 3,202,453 A | * | 8/1965 | Richards .............. | B60N 2/3011 297/342 X |
| 3,427,072 A | * | 2/1969 | Hale ..................... | A61G 15/02 297/342 X |

(Continued)

*Primary Examiner* — Rodney B White
(74) *Attorney, Agent, or Firm* — Vichit Chea; Price Heneveld LLP

(57) ABSTRACT

A seat assembly is provided herein. The seat assembly includes a seat member having a support surface. A pair of seat member bolsters is disposed on opposing sides of the seat member. A seat base supports the seat member and has a wraparound sidewall that extends above a bottom portion of each seat member bolster.

19 Claims, 11 Drawing Sheets

(56) References Cited

U.S. PATENT DOCUMENTS

| | | | | |
|---|---|---|---|---|
| 4,018,166 A * | 4/1977 | Gutridge | B61D 1/08 | 297/343 X |
| 4,221,428 A * | 9/1980 | Bowman | A47C 3/029 | 297/118 X |
| 4,230,366 A * | 10/1980 | Ruda | B60N 2/3081 | 297/487 X |
| 4,495,887 A * | 1/1985 | Mondrush | A47C 17/161 | 297/118 |
| 4,509,798 A * | 4/1985 | Strothers | B60R 21/02 | 297/487 X |
| 4,645,233 A | 2/1987 | Bruse et al. | | |
| 4,913,498 A * | 4/1990 | Forlivio | B60N 2/3084 | 297/488 X |
| 5,026,118 A * | 6/1991 | Vander Stel | B60N 2/3084 | 297/488 X |
| 5,100,199 A * | 3/1992 | Vander Stel | A61K 31/155 | 297/488 X |
| 5,628,547 A * | 5/1997 | Matsumiya | B60N 2/242 | 297/342 X |
| 5,722,726 A * | 3/1998 | Matsumiya | B60N 2/242 | 297/341 X |
| 5,748,473 A * | 5/1998 | Breed | B60N 2/002 | 297/410 X |
| 5,779,310 A * | 7/1998 | Suskey | A47C 17/2073 | 297/118 |
| 5,836,647 A * | 11/1998 | Turman | B60N 2/4228 | 297/216.1 X |
| 5,848,661 A * | 12/1998 | Fu | B60N 2/002 | 297/410 X |
| 5,857,745 A * | 1/1999 | Matsumiya | B60N 2/34 | 297/118 X |
| 5,947,559 A * | 9/1999 | Williams | A47C 17/134 | 297/342 X |
| 5,975,637 A * | 11/1999 | Geuss | B60N 2/002 | 297/410 X |
| 6,209,956 B1 * | 4/2001 | Dryburgh | A47C 1/0352 | 297/245 |
| 6,331,014 B1 * | 12/2001 | Breed | B60R 21/207 | 297/216.13 X |
| 6,367,873 B1 * | 4/2002 | Dorner | A47C 17/161 | 297/118 X |
| 6,402,195 B1 * | 6/2002 | Eisenmann | B60N 2/002 | 297/410 X |
| 6,412,870 B1 * | 7/2002 | Higgins | B60N 2/34 | 297/342 |
| 6,511,095 B1 * | 1/2003 | Kober | B60R 21/13 | 297/216.12 X |
| 6,588,837 B1 * | 7/2003 | Schultz | A47C 17/165 | 297/118 X |
| 6,604,785 B2 | 8/2003 | Bargheer et al. | | |
| 6,692,069 B2 * | 2/2004 | Beroth | A47C 1/0352 | 297/118 X |
| 6,739,651 B1 * | 5/2004 | Barefoot | A47C 17/161 | 297/118 X |
| 6,805,404 B1 * | 10/2004 | Breed | B60N 2/002 | 297/216.14 X |
| 7,145,263 B2 | 12/2006 | Nathan et al. | | |
| 7,229,118 B2 * | 6/2007 | Saberan | B60N 2/0224 | 297/341 X |
| 7,232,187 B1 * | 6/2007 | Sundararajan | B60N 2/0232 | 297/410 |
| 7,318,622 B2 * | 1/2008 | Rezag | B64D 11/06 | 297/118 |
| 7,384,067 B2 * | 6/2008 | Parks | B60N 2/4242 | 297/216.13 X |
| 7,469,861 B2 * | 12/2008 | Ferry | B60N 2/206 | 244/118.6 |
| 7,472,957 B2 * | 1/2009 | Ferry | B60N 2/206 | 297/343 X |
| 7,533,930 B1 * | 5/2009 | Fissette | B60N 2/01 | 297/118 |
| 7,547,068 B2 * | 6/2009 | Davis | B60N 2/2222 | 297/353 |
| 7,556,306 B2 * | 7/2009 | Yetukuri | B60N 2/0224 | 297/410 X |
| 7,588,115 B2 | 9/2009 | Breed | | |
| 7,686,394 B2 * | 3/2010 | Nishikawa | B60N 2/2222 | 297/353 X |
| 7,780,230 B2 * | 8/2010 | Serber | B60N 2/0745 | 297/216.1 |
| 7,794,012 B2 | 9/2010 | Szablewski | | |
| 7,837,259 B2 * | 11/2010 | Staab | B64D 11/06 | 297/118 X |
| 7,887,140 B1 * | 2/2011 | Forlivio | B60N 2/26 | 297/488 X |
| 8,201,883 B2 * | 6/2012 | Wuerstlein | B60N 2/002 | 297/216.12 |
| 8,296,018 B2 * | 10/2012 | Pedrero Iniguez | B60N 2/865 | 297/216.12 X |
| 8,303,036 B2 * | 11/2012 | Hankinson | B64D 11/06 | 297/342 X |
| 8,346,438 B2 * | 1/2013 | Breed | B60N 2/0232 | 297/216.12 |
| 8,348,339 B2 * | 1/2013 | Onuma | B60N 2/002 | 297/284.3 |
| 8,419,123 B2 * | 4/2013 | Hankinson | B64D 11/06 | 297/118 |
| 8,517,466 B1 * | 8/2013 | Wizorek | B63B 29/04 | 297/118 X |
| 8,579,375 B2 * | 11/2013 | Marais | B64D 11/06 | 297/341 |
| 8,616,643 B2 * | 12/2013 | Darbyshire | B64D 11/06 | 297/341 X |
| 8,690,252 B2 * | 4/2014 | Noguchi | B60N 2/002 | 297/410 X |
| 8,876,202 B2 * | 11/2014 | Olliges | B64D 11/0604 | 297/341 X |
| 8,931,834 B2 * | 1/2015 | Wallace | A47C 17/12 | 297/118 |
| 9,381,840 B2 * | 7/2016 | Tobata | B60N 2/16 | |
| 9,493,095 B2 * | 11/2016 | Koike | B60N 2/643 | |
| 9,499,077 B2 * | 11/2016 | Lamparter | B60N 2/24 | |
| 2001/0000639 A1 * | 5/2001 | Park | A47C 1/0352 | 297/342 X |
| 2002/0043860 A1 * | 4/2002 | Dinkel | B60N 2/809 | 297/410 |
| 2002/0093231 A1 * | 7/2002 | Estrada | B60N 2/829 | 297/216.12 |
| 2002/0195868 A1 * | 12/2002 | Tsai | B60N 2/265 | 297/487 |
| 2003/0015898 A1 * | 1/2003 | Breed | B60N 2/002 | 297/216.12 |
| 2003/0090133 A1 * | 5/2003 | Nathan | B60N 2/002 | 297/217.3 |
| 2003/0227199 A1 * | 12/2003 | Yoshizawa | B60N 2/4228 | 297/216.12 |
| 2004/0036345 A1 * | 2/2004 | Herberg | B60R 22/02 | 297/480 |
| 2005/0146174 A1 * | 7/2005 | Maddelein | B60N 2/02 | 297/216.13 X |
| 2005/0264051 A1 * | 12/2005 | Lawall | B60N 2/42781 | 297/216.12 |
| 2006/0055228 A1 * | 3/2006 | Tsai | B60N 2/2812 | 297/488 |
| 2006/0186713 A1 * | 8/2006 | Breed | B60N 2/0232 | 297/216.12 |
| 2006/0267384 A1 * | 11/2006 | Fischer | B60N 2/888 | 297/216.12 |
| 2007/0267909 A1 * | 11/2007 | Truckenbrodt | B60N 2/002 | 297/410 |
| 2008/0111407 A1 * | 5/2008 | Szablewski | B60N 2/80 | 297/216.12 |
| 2008/0288143 A1 * | 11/2008 | Smith | A61B 5/18 | 297/410 X |
| 2008/0315640 A1 * | 12/2008 | Bargheer | B60J 7/223 | 297/220 |

(56) References Cited

U.S. PATENT DOCUMENTS

| | | | |
|---|---|---|---|
| 2009/0066121 A1* | 3/2009 | Jacob | A47C 15/00 |
| | | | 297/118 |
| 2010/0225153 A1* | 9/2010 | Togura | B60N 2/002 |
| | | | 297/410 |
| 2010/0295349 A1* | 11/2010 | Schaal | B60N 2/002 |
| | | | 297/216.12 |
| 2011/0227378 A1* | 9/2011 | Swierczewski | B60N 2/06 |
| | | | 297/216.15 |
| 2012/0013155 A1* | 1/2012 | Hwang | B60N 2/002 |
| | | | 297/216.12 |
| 2012/0153687 A1* | 6/2012 | Kume | A61G 5/1067 |
| | | | 297/118 |
| 2012/0169093 A1* | 7/2012 | Kume | A61G 5/04 |
| | | | 297/118 |
| 2012/0235459 A1* | 9/2012 | Yetukuri | B60N 2/002 |
| | | | 297/391 |
| 2012/0261969 A1* | 10/2012 | Osaki | B60N 2/002 |
| | | | 297/410 |
| 2013/0241247 A1* | 9/2013 | Wallace | B64D 11/06 |
| | | | 297/118 |
| 2014/0191541 A1* | 7/2014 | Ohta | A61G 5/04 |
| | | | 297/118 |
| 2014/0210235 A1* | 7/2014 | Ferry | B60N 2/206 |
| | | | 297/118 |
| 2016/0100250 A1* | 4/2016 | Baskin | H04R 1/02 |
| | | | 297/217.4 |

* cited by examiner

VEHICLE SEAT ASSEMBLY

CROSS-REFERENCE TO RELATED APPLICATION

This application claims priority to U.S. Provisional Application No. 62/550,101 filed Aug. 25, 2017, entitled "Vehicle Seat Assembly," the entire disclosure of which is hereby incorporated by reference herein.

FIELD OF THE INVENTION

The present disclosure generally relates to a seat assembly, and more particularly, to a seat assembly configured for autonomous vehicles, wherein the seat assembly may face various directions. Accordingly, features of the seat assembly may be integrated into the seat assembly to accommodate the various positions that a seat occupant may assume within the vehicle.

BACKGROUND OF THE INVENTION

Various safety features in a vehicle may function in various manners based on the presence of an occupant. It is therefore desired to implement vehicle seat assemblies that may adjust based on a specific occupant disposed within the seat assembly.

SUMMARY OF THE INVENTION

According to one aspect of the present disclosure, a seat assembly is provided herein. A seat base supports a seat member and a seatback. A headrest assembly is disposed within the seatback. A position sensor is disposed within the seatback. An adjustment mechanism operably couples the seatback to the seat base. The seatback is vertically adjusted based on a signal detection from the position sensor.

According to another aspect of the present disclosure, a seat assembly is provided herein. The seat assembly includes a seat base supporting a seat member and a seatback. A headrest assembly is disposed within the seatback. A position sensor is disposed within the seatback for determining a height of an occupant. A seat sensor determines a presence of an occupant.

According to yet another aspect of the present disclosure, a seat assembly is provided herein. The seat assembly includes a seat base supporting a seatback. A headrest assembly is disposed within the seatback. A position sensor is disposed within the seatback. An adjustment mechanism operably couples the seatback to the seat base. The seatback is vertically adjusted based on a height of an occupant.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 3:
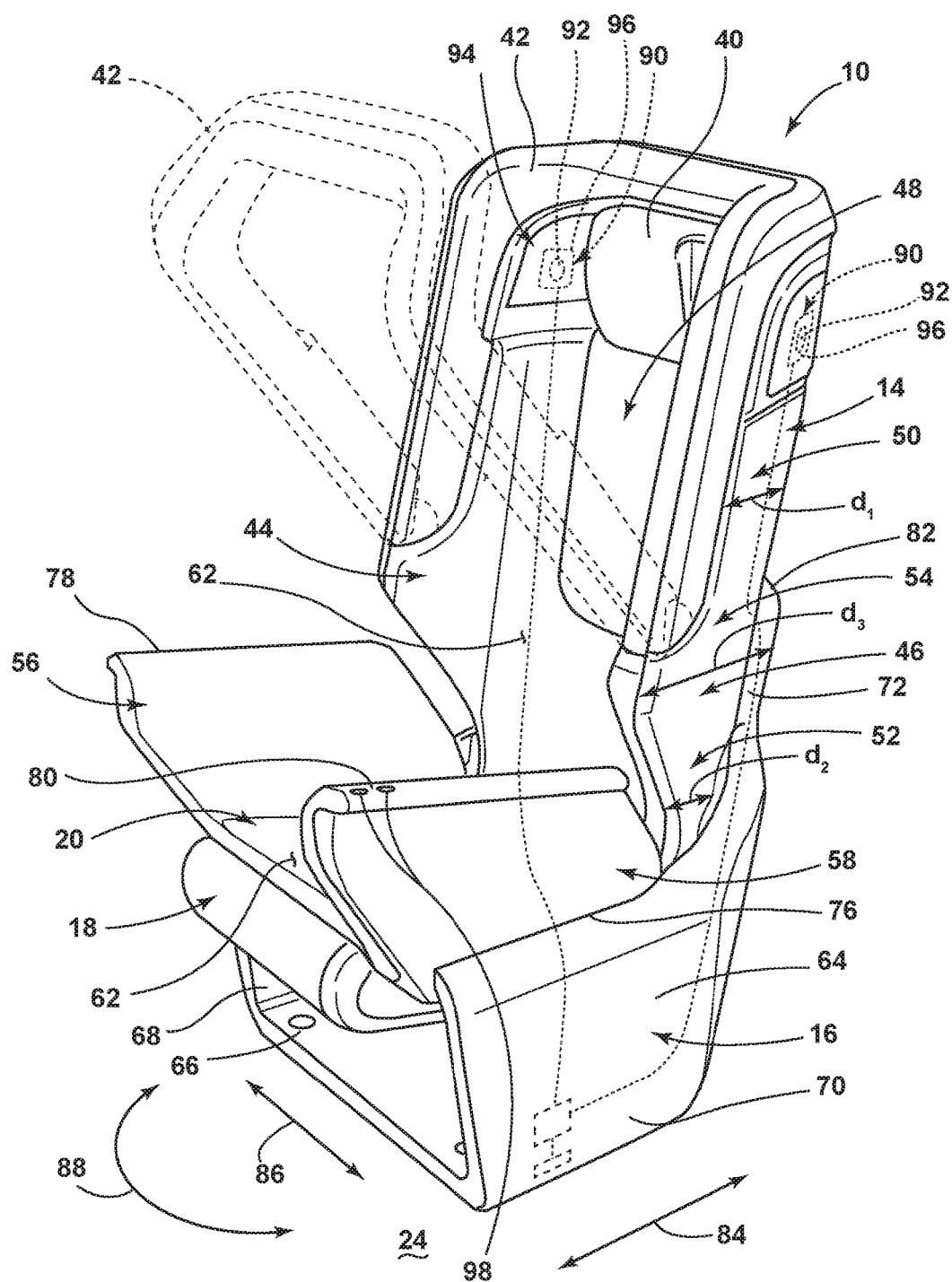
FIG. 3 is a side perspective view of the seat assembly, according to some examples.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

The following disclosure describes a seat assembly that may be disposed within a vehicle. The seat assembly may include a seat member having a support surface. A pair of seat member bolsters may be disposed on opposing sides of the seat member. A seat base supports the seat member and has a wraparound sidewall that extends above a bottom portion of each seat member bolster. The seat assembly may be disposed in a vehicle that is capable of autonomous operation.

Figure 1:
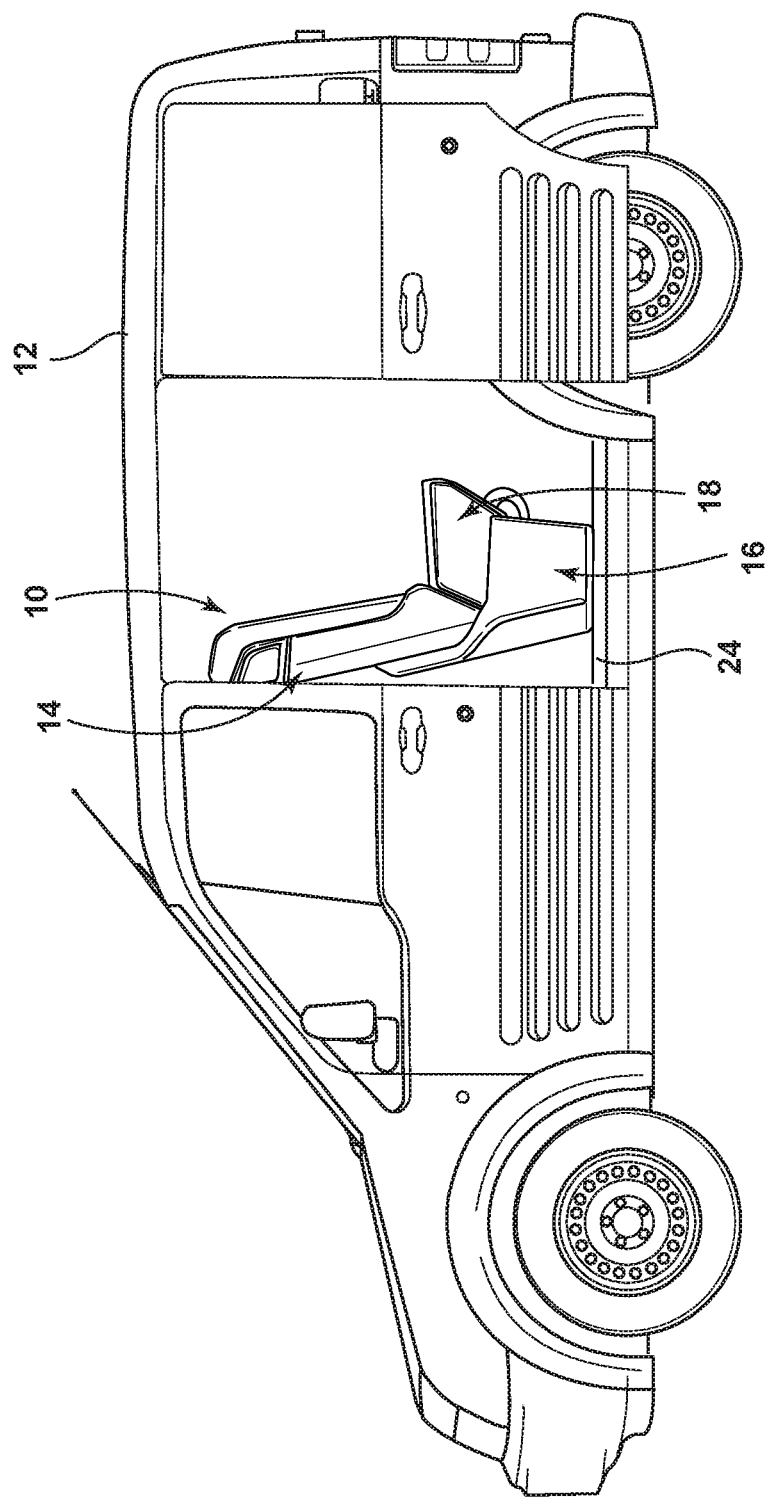
FIG. 1 is a side plan view of a vehicle incorporating a seat assembly therein, according to some examples.
Figure 4:
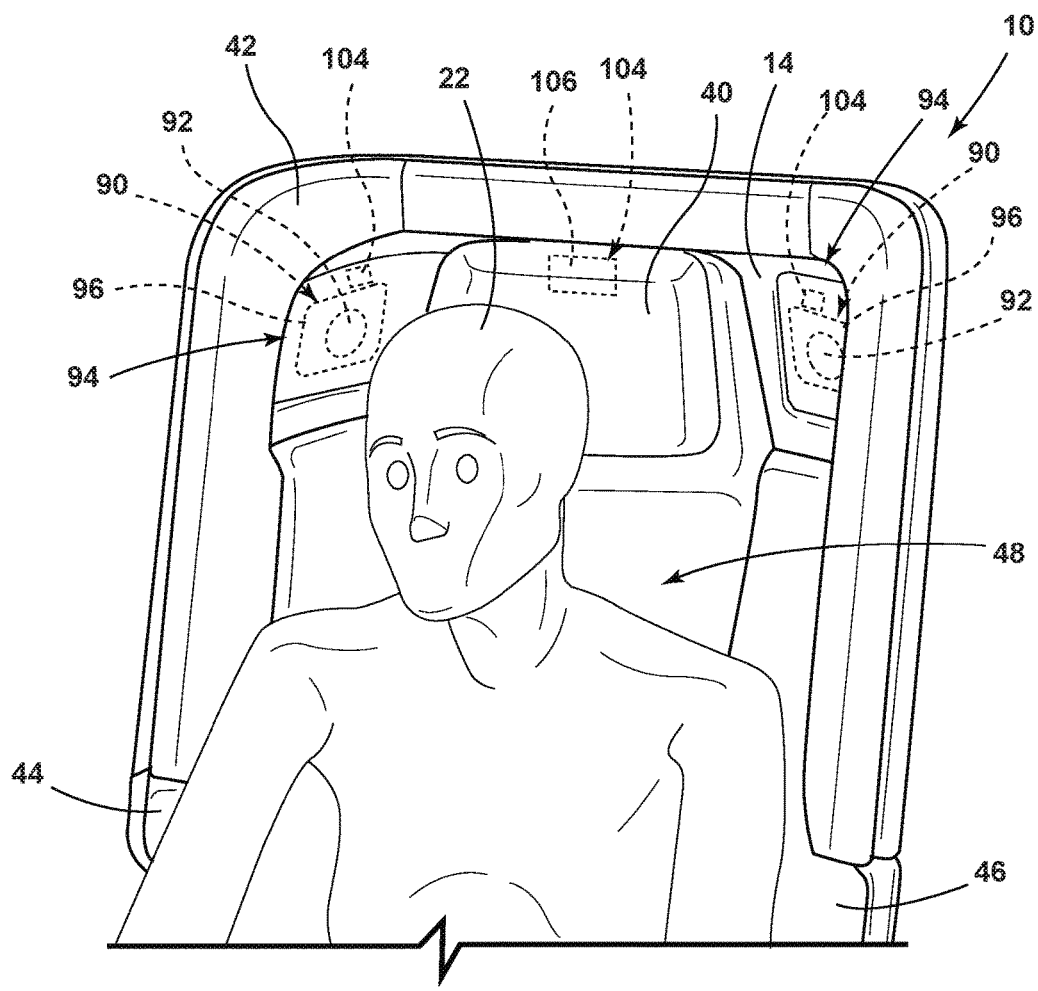
FIG. 4 is a partial front perspective view of an occupant disposed within the seat assembly, the seat assembly having a sensor for detecting a height of the occupant, according to some examples.

Referring to FIG. 1, a seat assembly 10 is positioned within a vehicle 12. The seat assembly 10 may be movable and positioned in various locations throughout the vehicle 12 other than the illustrated position. The seat assembly 10 includes a seat base 16 that is coupled with a seatback 14, which is contemplated to be vertically adjustable relative to the seat base 16. The seat base 16 also supports a seat member 18 having a support surface 20 (FIG. 4) for supporting an occupant 22 (FIG. 4). The seat base 16 is slidably and pivotably coupled to a floor 24 of the vehicle 12 to permit adjustment of the seat assembly 10 relative to the floor 24 of the vehicle 12. In some examples, however, the seat base 16 may be fixedly coupled with the floor 24 of the vehicle 12, without departing from the scope of the present disclosure.

Figure 2:
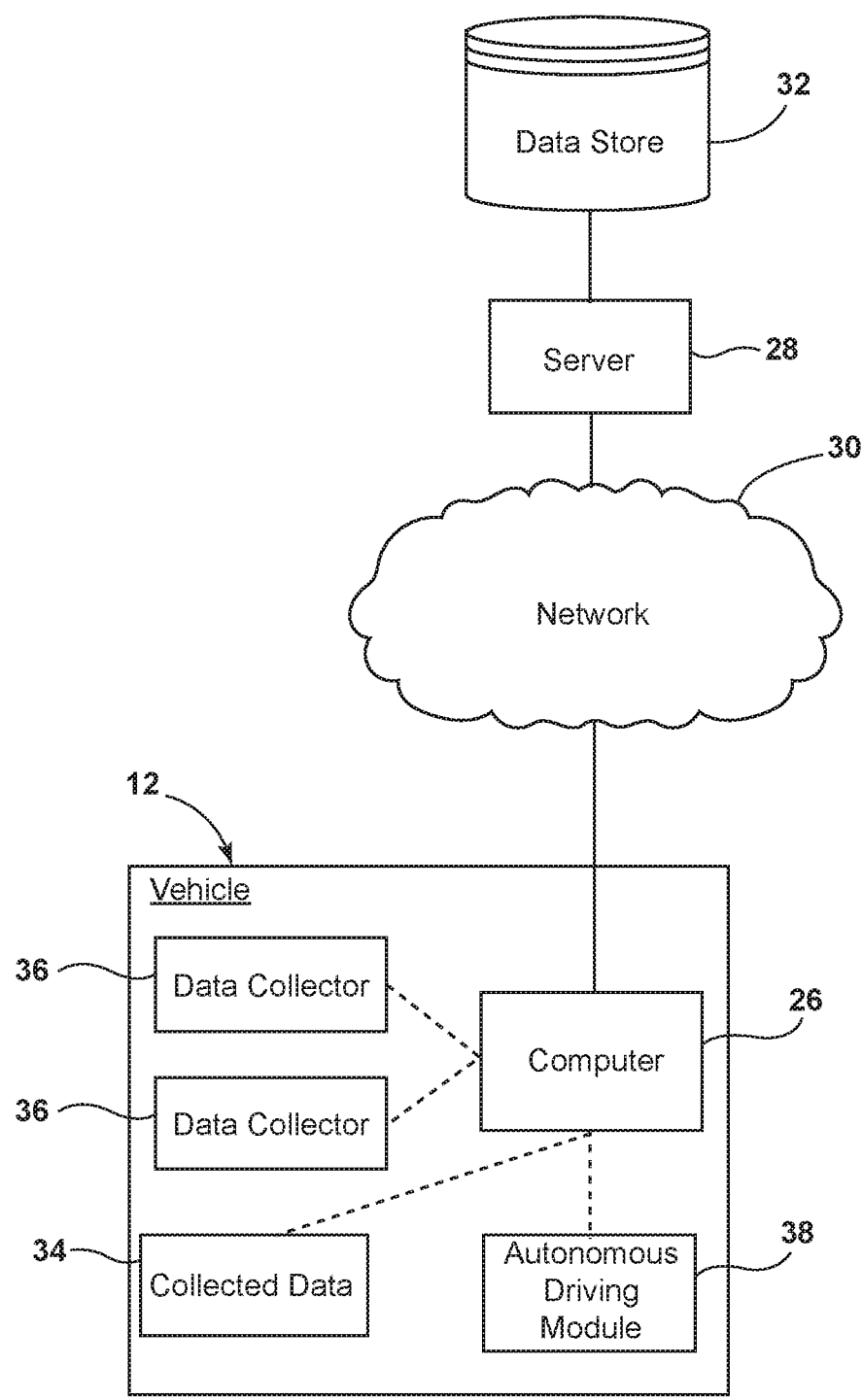
FIG. 2 is a block diagram of an exemplary autonomous vehicle system that may be employed by the vehicle, according to some examples.

Referring to FIG. 2, the vehicle 12 may be a manually operated vehicle (i.e. using a human driver) or may be autonomously driven by an onboard computer 26. Additionally, or alternatively, the vehicle 12 may be remotely controlled (e.g., via an operator located in a different location). In autonomous examples, one of which is exemplarily illustrated in FIG. 2, the computer 26 may be configured for communicating with one or more remote sites such as a server 28 via a network 30. The one or more remote sites may include a data store 32. The vehicle 12, including the computer 26, is configured to receive information, e.g., collected data 34, from one or more data collectors 36 related to various components of the vehicle 12, e.g., a steering wheel, brake pedal, accelerator pedal, gearshift lever, etc. The computer 26 generally includes an autonomous driving module 38 that includes instructions for autonomously, i.e., without some, or any, operator input, operating the vehicle 12, including possibly in response to instructions received from the server 28. Further, the computer 26, e.g., in the module 38, may generally include instructions for receiving data, e.g., from the one or more data collectors 36, such as an interactive voice response (IVR) system, a graphical user interface (GUI) including a touchscreen or the like, etc.

By determining driver characteristics and/or vehicle operating conditions, the module 38 may determine an appropriate control or controls to be applied to one or more vehicle components. For example, the module 38 may determine whether, and when, a steering wheel should be moved to mimic or approximate vehicle steering being conducted as part of an autonomous driving operation, e.g., autonomous driving according to instructions from the server 28 and/or the module 38.

The vehicle computer 26 generally includes a controller having a processor and a memory, the memory including one or more forms of computer-readable media, and storing instructions executable by the processor for performing various operations. Further, the computer 26 may include more than one computing device, e.g., controllers or the like included in the vehicle 12 for monitoring and/or controlling various vehicle components, e.g., an engine control unit (ECU), transmission control unit (TCU), etc. The computer 26 may be generally configured for communications on a controller area network (CAN) bus or the like. The computer 26 may also have a connection to an onboard diagnostics connector (OBD-II). Via the CAN bus, the OBD-II, and/or other wired or wireless mechanisms, the computer 26 may transmit messages to various devices in the vehicle 12 and/or receive messages from the various devices, e.g., controllers, actuators, sensors, electronic devices, etc., including data collectors 36. In addition, the computer 26 may be configured for communicating with the network 30, which, may include various wired and/or wireless networking technologies, e.g., cellular, Bluetooth, wired and/or wireless packet networks, etc.

Instructions may be stored in and executed by the computer 26 in the autonomous driving module 38. Using data received in the computer 26, e.g., from the data collectors 36, the server 28, etc., the module 38 may control various vehicle 12 components and/or operations without a driver to operate the vehicle 12. For example, the module 38 may be used to regulate vehicle speed, acceleration, deceleration, steering, operation of components such as lights, windshield wipers, etc. Further, the module 38 may include instructions for evaluating information received in the computer 26 relating to vehicle 12 operator characteristics, e.g., from the data collectors 36.

The data collectors 36 may include a variety of vehicle equipment. For example, various controllers in the vehicle 12 may operate as data collectors 36 to provide data 34 via the CAN bus, e.g., data 34 relating to vehicle speed, acceleration, etc. Further, sensors or the like, global positioning system (GPS) equipment, navigation systems, etc., could be included in the vehicle 12 and configured as data collectors 36 to provide data to the computer 26, e.g., via a wired or wireless connection. Sensor data collectors 36 could include mechanisms such as RADAR, LIDAR, sonar, etc. sensors that could be deployed to measure a distance between the vehicle 12 and other vehicles or objects. Yet other sensor data collectors 36 could include cameras, breathalyzers, motion detectors, etc., i.e., data collectors 36 to provide data for evaluating a condition or mode of a vehicle 12 operator. In addition, the data collectors 36 may include sensors to detect a position, change in position, rate of change in position, etc., of vehicle components such as a steering wheel, brake pedal, accelerator, gearshift lever, etc.

The memory of the computer 26 generally stores the collected data 34. The data 34 is generally collected using the one or more data collectors 36, and may additionally include data calculated therefrom in the computer 26, and/or the server 28. In general, the collected data 34 may include any data that may be gathered by a collection device and/or computed from such data 34. For example, the collected data 34, as mentioned above, may include data concerning a position, change in position, rate of change in position, etc., of the vehicle 12 components such as a steering wheel, brake pedal, accelerator, gearshift lever, etc.

The network 30 represents one or more mechanisms by which a vehicle computer 26 may communicate with a remote server 28. Accordingly, the network 30 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN), and/or wide area networks (WAN), including the Internet, providing data communication services.

The server 28 may be one or more computer servers, each generally including at least one processor and at least one memory, the memory storing instructions executable by the processor, including instructions for carrying out various steps and processes. The server 28 may include or be communicatively coupled to a data store 32 for storing the collected data 34, as well as parameters for evaluating operator input, e.g., parameters for a specific vehicle operator, a specific vehicle 12, particular weather or other environmental conditions, etc. Further, the server 28 may store information related to multiple vehicles 12, traffic conditions, weather conditions, etc., within a geographic area, with respect to a particular road, city, etc. The server 28 could also be configured to provide drive-by-wire instructions to vehicles 12 in an autonomous driving area, e.g., a road, etc., such as an "all stop" instruction for all vehicles 12 to stop, a speed restriction, a lane restriction, etc.

In operation, the vehicle 12 may be operated in an autonomous mode with one or more vehicle occupants 22 (FIG. 4) disposed within one or more seat assemblies 10 within the vehicle 12. The seat assembly 10 may be moved to various locations or positions within the vehicle 12. Due to numerous occupants 22 entering and exiting the vehicle 12 and the various positions of the seat assembly 10, the seat assembly 10 may include various safety features therein for occupants 22 of varying body types. The seat member bolsters 56, 58 and seatback bolsters 44, 46 may assist in maintaining the occupant 22 in the seat assembly 10 during lateral and cross-car loads and/or act as a reaction surface for the safety features disposed within the seat assembly 10.

Referring now to FIG. 3, the seat assembly 10 may be a highly contoured and stylized seat assembly 10 that is configured for use in an autonomous vehicle 12, as provided herein, but is not limited to such use. The seat assembly 10 generally includes the seat member 18, which is supported by the seat base 16. In FIG. 3, the seatback 14 is generally shown in an upright use position for supporting a vehicle occupant 22 in an upright, seated position. The seat assembly 10 further includes a headrest assembly 40 that is integrated into the seatback 14.

With further reference to FIG. 3, a restraint bar 42 is coupled to the seatback 14. The restraint bar 42 may be coupled to any portion of the seatback 14, such as a front portion of the seatback 14. The restraint bar 42 may be operable between a first position and a second position (shown in phantom). The restraint bar 42 may be equipped with at least one deployable safety feature, such as an airbag. The restraint bar 42 generally contours to the seatback 14 to present an occupant 22 with an integrated and aesthetically pleasing appearance. In some examples, the restraint bar 42 may be generally U-shaped.

Referring to FIGS. 3 and 4, the seatback 14 includes first and second seatback bolsters 44, 46 disposed on opposite sides of an inset contact surface 48. The seatback bolsters 44, 46 may have an upper region 50 that extends a first distance $d_1$ forwardly of a contact surface 48 of the seatback 14. A lower region 52 extends a second distance $d_2$ forwardly of the contact surface 48 of the seatback 14. A middle region 54 extends a third distance $d_3$ forwardly of the contact surface 48 of the seatback 14. In some examples, the second distance $d_2$ is less than the first distance $d_1$ and the third distance $d_3$ may be greater than the first and second distances $d_1$, $d_2$.

The seat member 18 similarly includes first and second seat member bolsters 56, 58, which extend outwardly from the generally inset support structure. In some instances, the seat member bolsters 56, 58 and the support structure may be formed as a cradle that is disposed on the seat base 16. The seat member 18 and the seatback 14 may include a coverstock 62 over portions thereof, which may be comprised of a flexible material (i.e., any material that may elastically deform). The coverstock 62 is configured to provide any desired aesthetic look and feel to the seat assembly 10.

Figure 10:
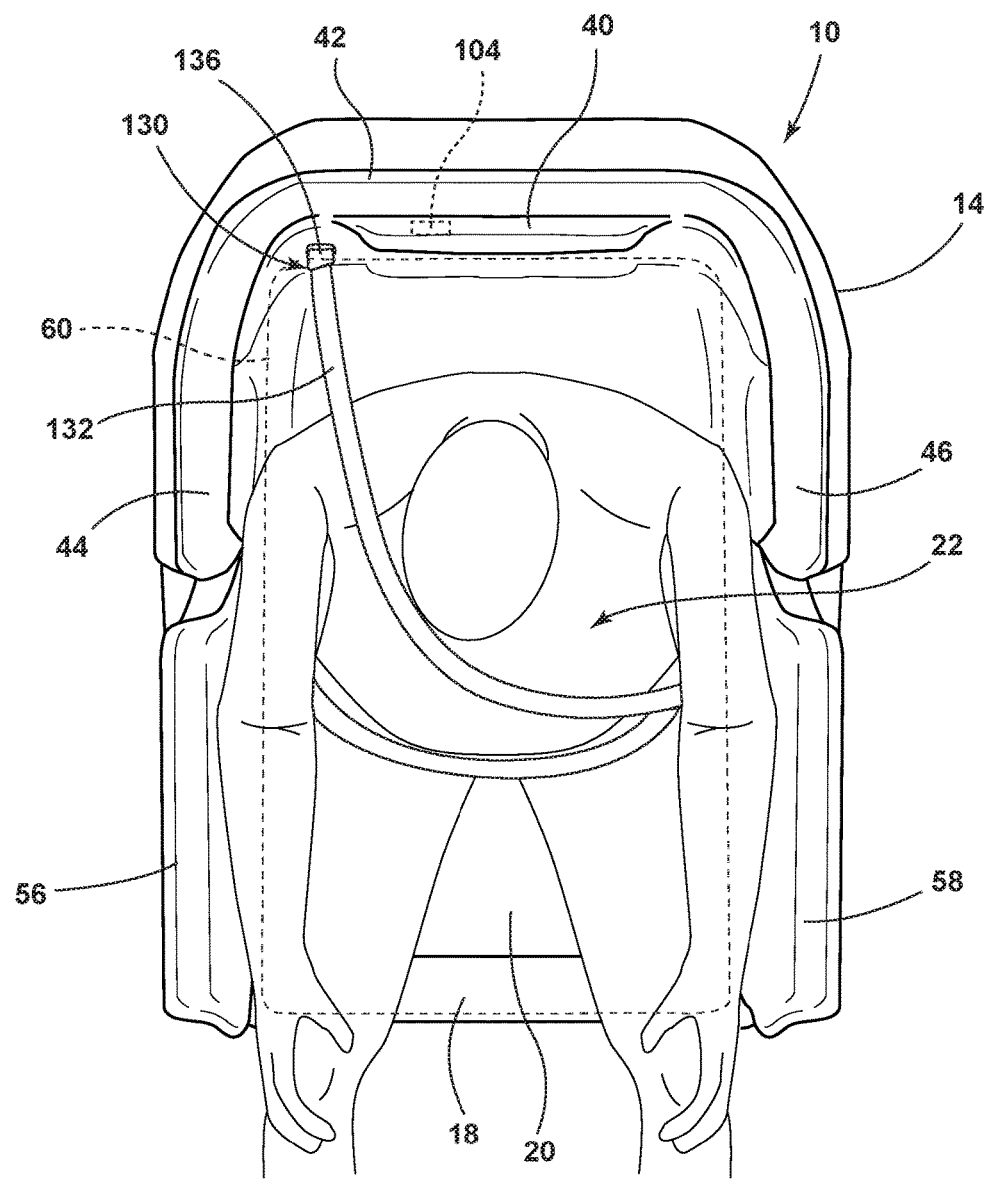
FIG. 10 is a top plan view of the seat assembly incorporating a seatbelt assembly, according to some examples.
Figure 11:
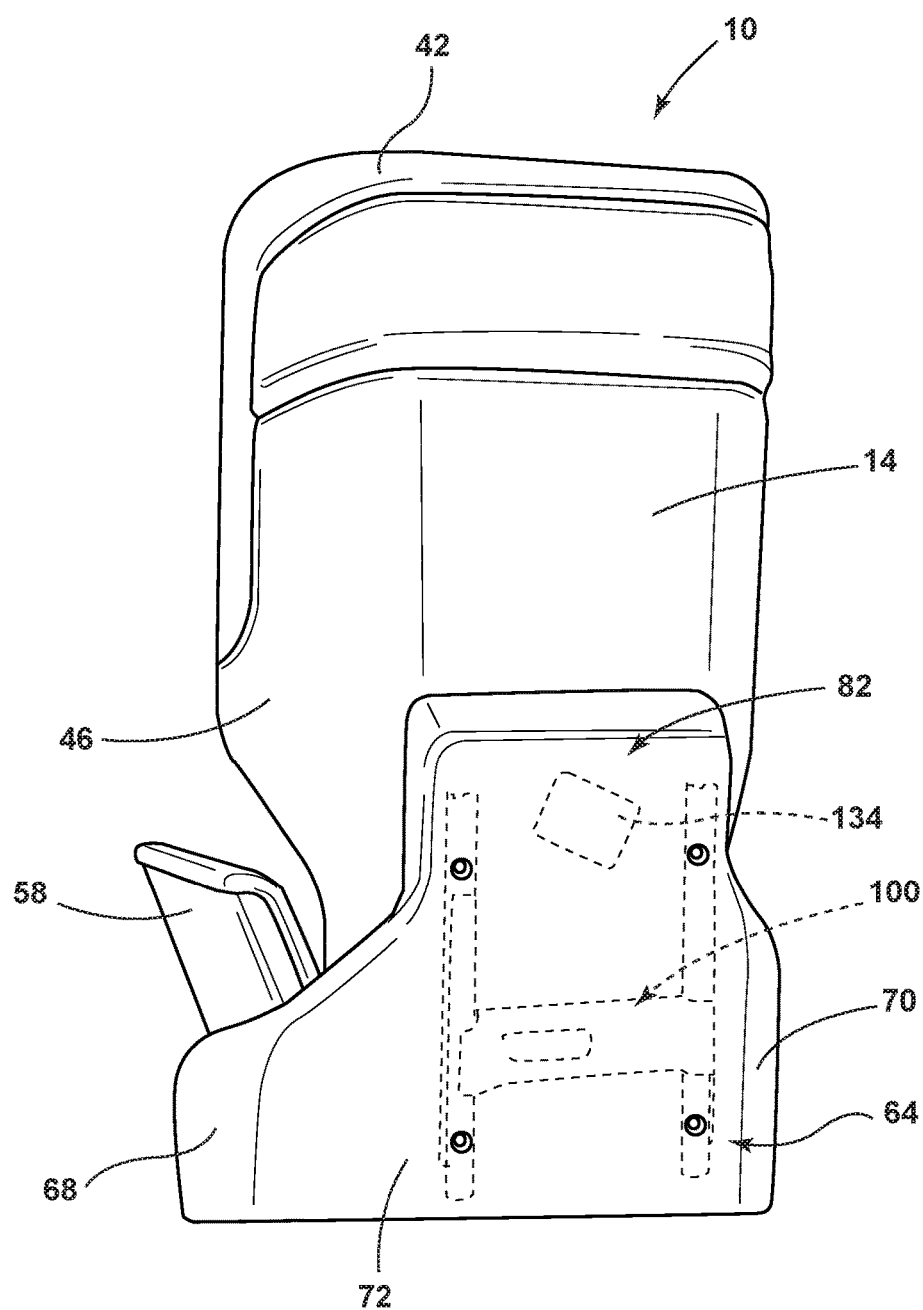
FIG. 11 is a rear perspective view of the seatback, the seat member, and the seat base, according to some examples.

The first and second seatback bolsters 44, 46, the first and second seat member bolsters 56, 58, the contact surface 48 of the seatback 14, and the support structure of the seat member 18 generally define a bucket seat configuration for the seat assembly 10, configured to cradle a seat occupant 22 and define a space 60 (FIG. 10) in which an occupant 22 is at least partially maintained. The first and second seat member bolsters 56, 58 and the first and second seatback bolsters 44, 46 are generally configured to cooperate to position, support, and retain the seat occupant 22 while riding in the vehicle 12, such as during autonomous operation of the vehicle. The cradling features of the first and second seat member bolsters 56, 58 and the first and second seatback bolsters 44, 46 provide load management to maintain the occupant 22 in the seat assembly 10 during lateral and cross-car loads. Further, these cradling features keep the seat occupant 22 in the proper position, or limit the positions in which an occupant 22 may be disposed, within the seat assembly 10 for a pre-activated restraint system in advance of a threat. With the seat occupant 22 located in a proper position within the space 60, the safety features incorporated into the seat assembly 10 and/or the vehicle 12 can operate as intended during an impact event.

As further shown in FIG. 3, the seat base 16 includes a wraparound sidewall 64 that upwardly extends from a support portion 66. The wraparound sidewall 64 includes first and second side portions 68, 70 and a rear portion 72. In some examples, the seat member bolsters 56, 58 include outwardly extending top surfaces 78, 80. The top surface 78, 80 of each respective seat member bolster 56, 58 extends over a top surface 74, 76 of the respective first and second side portions 68, 70 of the wraparound sidewall 64.

The rear portion 72 includes a raised central portion 82 and it is contemplated that one or both the rear portion 72 and the raised central portion 82 are operably coupled to the seatback 14 with a height adjustment mechanism 100 (FIG. 6) disposed therebetween.

The support portion 66 is configured to be mounted to the support surface 20, such as the vehicle floor 24. The support portion 66 can be mounted to a track assembly for moving the seat assembly 10 between fore and aft positions (as indicated by arrow 84) and/or vehicle lateral (i.e., vehicle side-to side) positions (as indicated by arrow 86). The seat assembly 10 can also be mounted to a swivel assembly to swivel the seat assembly 10 along the path as indicated by arrow 88. Thus, the seat assembly 10 can be oriented in forward facing and/or rearward facing directions within the vehicle 12. As such, fixed mounting locations for safety features, such as dashboard-mounted airbag systems and column mounted airbag curtains, for example, may not be effective to the seat occupant 22 positioned in a non-forward facing direction. Thus, some safety features may be incorporated into the seat assembly 10 to move with the seat assembly 10 and retain consistent positions relative to the seat occupant 22.

With reference to FIGS. 3 and 4, the seat assembly 10 may further include an integrated audio system 90. The audio system 90 includes speakers 92 mounted within the seatback 14 that convert electrical signals into sound. The sound may provide entertainment through music and/or provide information through instructions or directions. In some audio systems 90, it may be desirable to receive sound through a direct path to the listener. By placing the speakers 92 within a concave area 94, the sound may be isolated within the seat assembly 10 leading to minimal distraction of proximate passengers within the vehicle 12. The sound may use two or more separate channels, such as stereo, that give the sound a more natural distribution.

The speakers 92 may be mounted in the concave area 94 of a front surface of the seatback 14. As used herein, the term "front surface" refers to a surface of a seatback 14 that faces the seat occupant 22. While the examples refer to front surface mounted speakers 92, speakers 92 may be mounted in any surface of the seat assembly 10. A sound barrier 96 may be mounted to conform to the surface of the concave area 94 and may be formed from an acoustically reflective or an acoustically absorbent material. For example, the sound barrier 96 may be formed from foam, plastic, wood, or the like. Additionally, the sound barrier 96 may be formed of some other rigid or flexible material, and covered with upholstery, such cloth, vinyl, or leather. In order to accommodate safety concerns, the sound barrier 96 may be formed from a soft, resilient material, such as foam.

In some examples, the speakers 92 may be capable of noise control and cancellation via active or passive methods. Active noise control is sound reduction using a power source. Passive noise control refers to sound control by noise-reduction materials, such as through the sound barrier 96 and the like, rather than a power source. According to some methods of active noise control, once the noise signal is recognized, it is reduced and removed by subtracting it from the transmitted or received signal. This technique is implemented using a digital signal processor (DSP) or software. Adaptive algorithms are designed to analyze the waveform of the background aural or non-aural noise, then based on the specific algorithm generate a signal that will either phase shift or invert the polarity of the original signal. This inverted signal (in anti-phase) is then amplified and a transducer creates a sound wave directly proportional to the amplitude of the original waveform, creating destructive interference. This effectively reduces the volume of the perceivable noise.

Sound is a pressure wave, which consists of a compression phase and a rarefaction phase. A noise-cancellation speaker emits a sound wave with the same amplitude but with inverted phase (also known as antiphase) to the original sound. The waves combine to form a new wave, in a process called interference and effectively cancel each other out—an effect which is called phase cancellation. A noise-cancellation speaker may be co-located with the speaker 92 to be attenuated. In this case, it has the same audio power level as the source of the unwanted sound. Alternatively, the transducer emitting the cancellation signal may be located at the location where sound attenuation is wanted (e.g. the seat assembly 10). This may use a lower power level for cancellation and is effective in distinct locations. Accordingly, in small, partially enclosed spaces (e.g. the seat assembly 10) global noise reduction can be achieved via the speakers 92, feedback microphones, and measurement of the modal responses of the enclosure.

One or more controls 98 may be disposed within the seat member bolsters 56, 58, or in any other practicable location on the seat assembly 10 and/or within the vehicle 12 that controls one or more functions of the vehicle 12 and/or the seat assembly 10. For example, the one or more controls 98 may control the audio system 90 within the seat assembly 10 and/or the vehicle 12. The controls 98 may additionally and/or alternative control a reclining feature and or any other desired feature of the seat assembly 10. It will be appreciated that the one or more controls 98 may control any other function of the vehicle 12 and/or seat assembly 10 without departing from the scope of the present disclosure.

Figure 5:
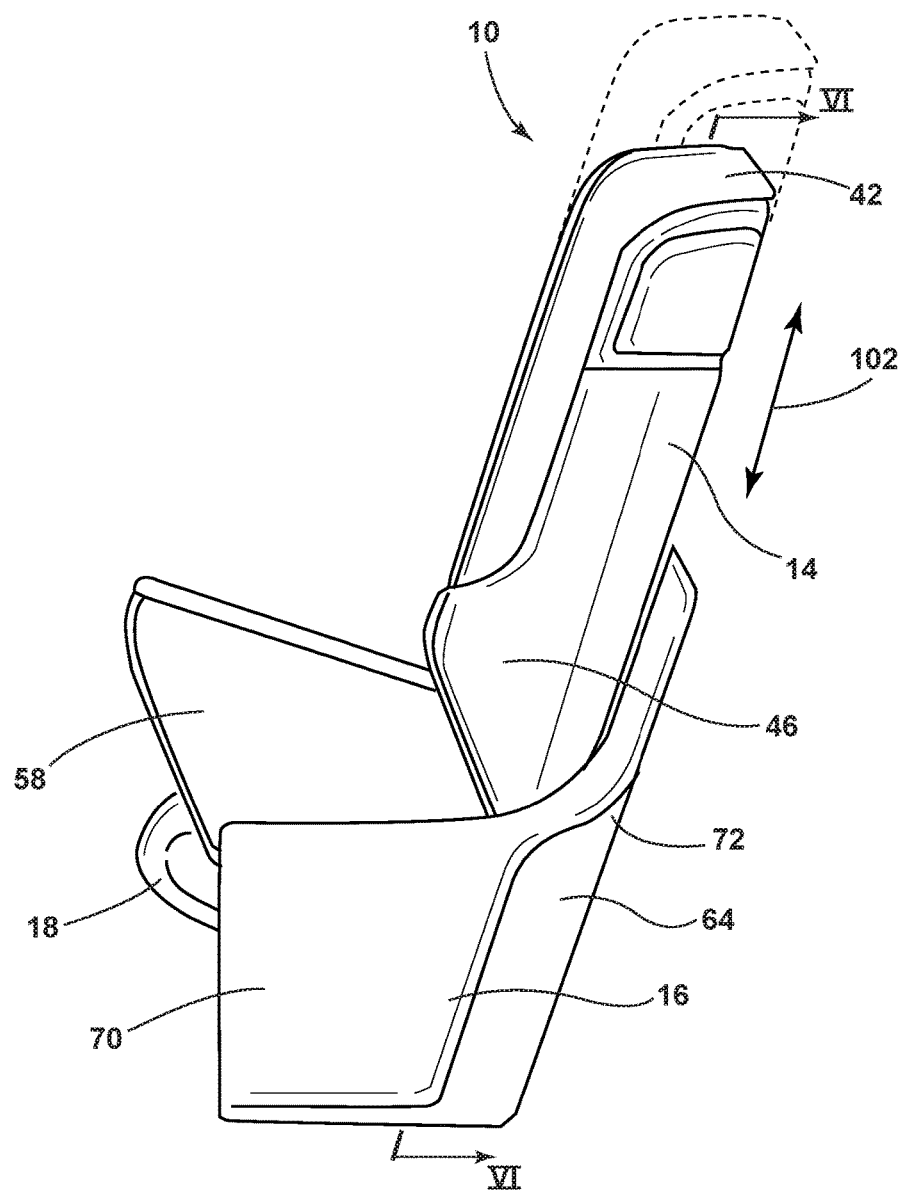
FIG. 5 is a side plan view of the seat assembly of FIG. 3.
Figure 6:
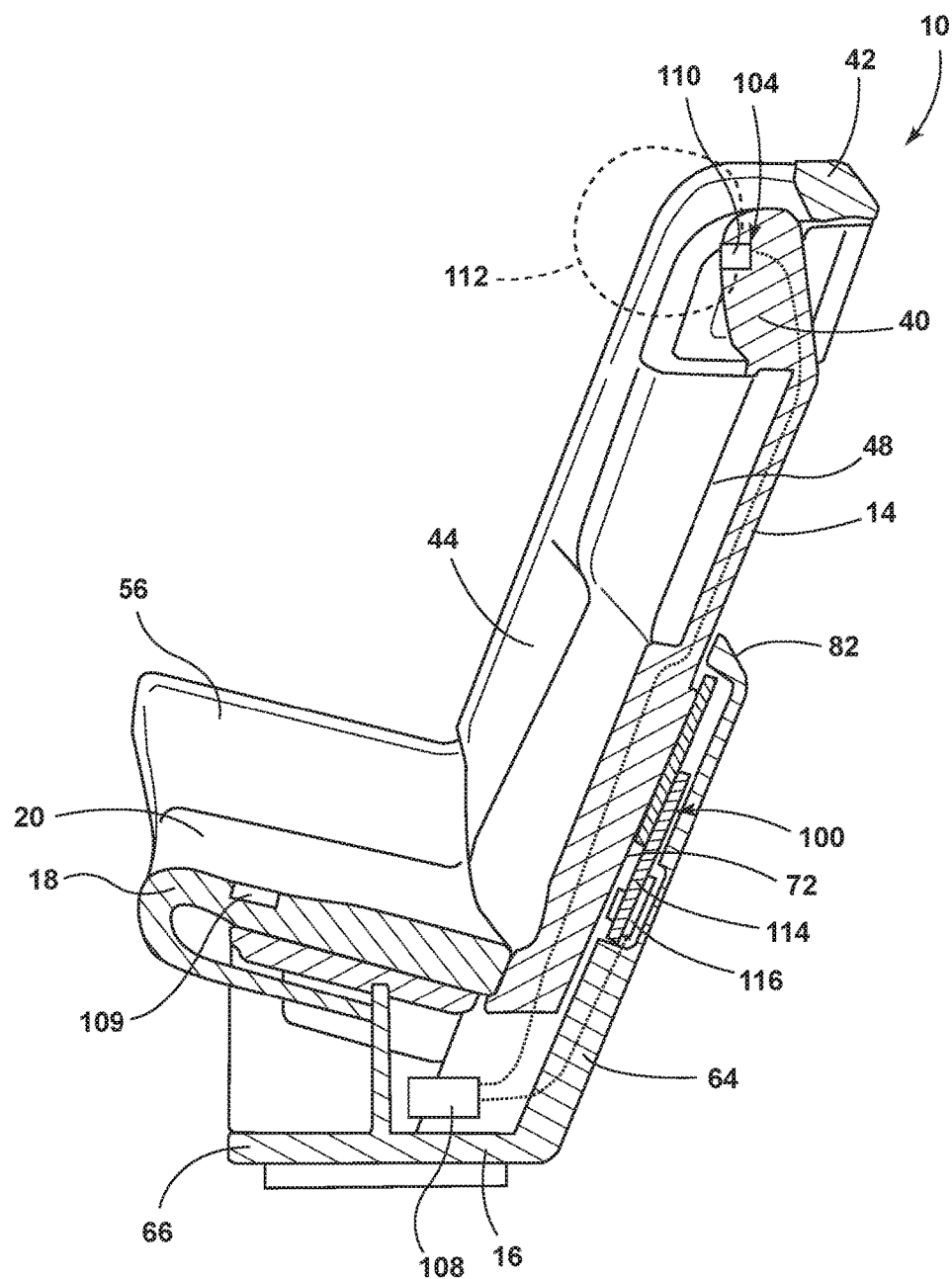
FIG. 6 is a cross-sectional view of the seat assembly taken along the line VI-VI of FIG. 5.

Referring to FIGS. 4-6, the seatback 14 may be vertically adjustable along arrow 102 through an adjustment mechanism 100. The adjustment mechanism 100 may be operably coupled with a position sensor 104. The position sensor 104 may be configured as an ultrasonic sensor 106 that detects obstacles forward of the seatback 14. The ultrasonic sensor 106 is coupled to a controller 108 that generates output signals for the adjustment mechanism 100 to adjust a height of the seatback 14. The ultrasonic sensor 106 may be mounted within the headrest assembly 40, above the headrest assembly 40, and/or in any other practicable location. In some examples, the position sensor 104 may be disposed within the concave area 94 of the seatback 14 or any other practicable position within the seatback 14 and/or the vehicle 12.

The ultrasonic sensor 106 may include a transmitter (not shown) adapted to transmit ultrasonic waves forwardly thereof, and a receiver (not shown) adapted to receive the waves reflected from any object in the space 60 defined within the seat assembly 10. The controller 108 determines the transit time elapsed between transmitting the wave and receiving the same wave reflected from the occupant 22. Subsequently, the controller 108 generates an output signal corresponding to the relative distance between the vehicle 12 and the occupant 22 using the formula $d=2c/t$, where c is the speed of sound and t is the transit time. Based on this calculation, the ultrasonic sensor 106 may determine whether the occupant 22 is disposed within the seat assembly 10. The ultrasonic sensor 106 will also determine whether the occupant 22 is disposed forward of the position sensor 104. If the occupant 22 is disposed forward of the position sensor 104, the seatback 14 will be adjusted upward until the occupant 22 is no longer detected.

The seat assembly 10 may further include a seat sensor 109 for determining the presence of the occupant 22. The seat sensor 109, which includes, but is not limited to, any type of proximity sensor, seat airbag sensor, pressure sensor, etc., may be utilized for determining whether the seat assembly 10 is occupied. If the seat sensor 109 detects that the seat assembly 10 is occupied and the position sensor 104 does not detect the occupant 22, the seatback 14 may be adjusted downwardly until the occupant 22 is detected by the position sensor 104. The seatback 14 may be adjusted for the comfort of occupant 22 and/or to align safety features that are integrated within the seat assembly 10 with the occupant 22. For example, the seatback 14 may be adjusted to assist with proper deployment of the restraint bar 42.

Referring to FIG. 6, in some examples, the position sensor 104 may additionally. and/or alternatively, be configured as a capacitive sensor 110 that can also be provided within the seatback 14. The capacitive sensor 110 provides a sense activation field 112 that encompasses a portion of the headrest assembly 40 and can detect capacitive changes resulting from a conductor, such as the head of seat occupant 22, being within the sense activation field 112 of the capacitive sensor 110 (e.g. within the seat assembly 10). The capacitive sensor 110 may be positioned in a predefined position such that the sensor may detect the height of the occupant 22. In some examples, if the capacitive change meets or exceeds a predetermined threshold level indicating that the occupant 22 is forward of the capacitive sensor 110 and has moved to the removed position, the adjustment mechanism 100 can be prompted to activate accordingly. While the position sensor 104 is shown and described herein as capacitive sensor 110, it should be appreciated that additional or alternative types of proximity sensors can be used for detecting various other signal changes, such as, but not limited to, inductive sensors, optical sensors, temperature sensors, resistive sensors, the like, or a combination thereof. Moreover, any other position-detecting device may be utilized in conjunction with, or in lieu of, the proximity sensor.

According to various examples, the seatback 14 may be capable of properly accepting a wide range of occupant body types. For example, the seat assembly 10 may be adjustable for torsos ranging from a $2.5^{th}$ percentile female to a $99^{th}$ percentile male, as set forth in the Federal Motor Vehicle Safety Standards (FMVSS).

Figure 7:
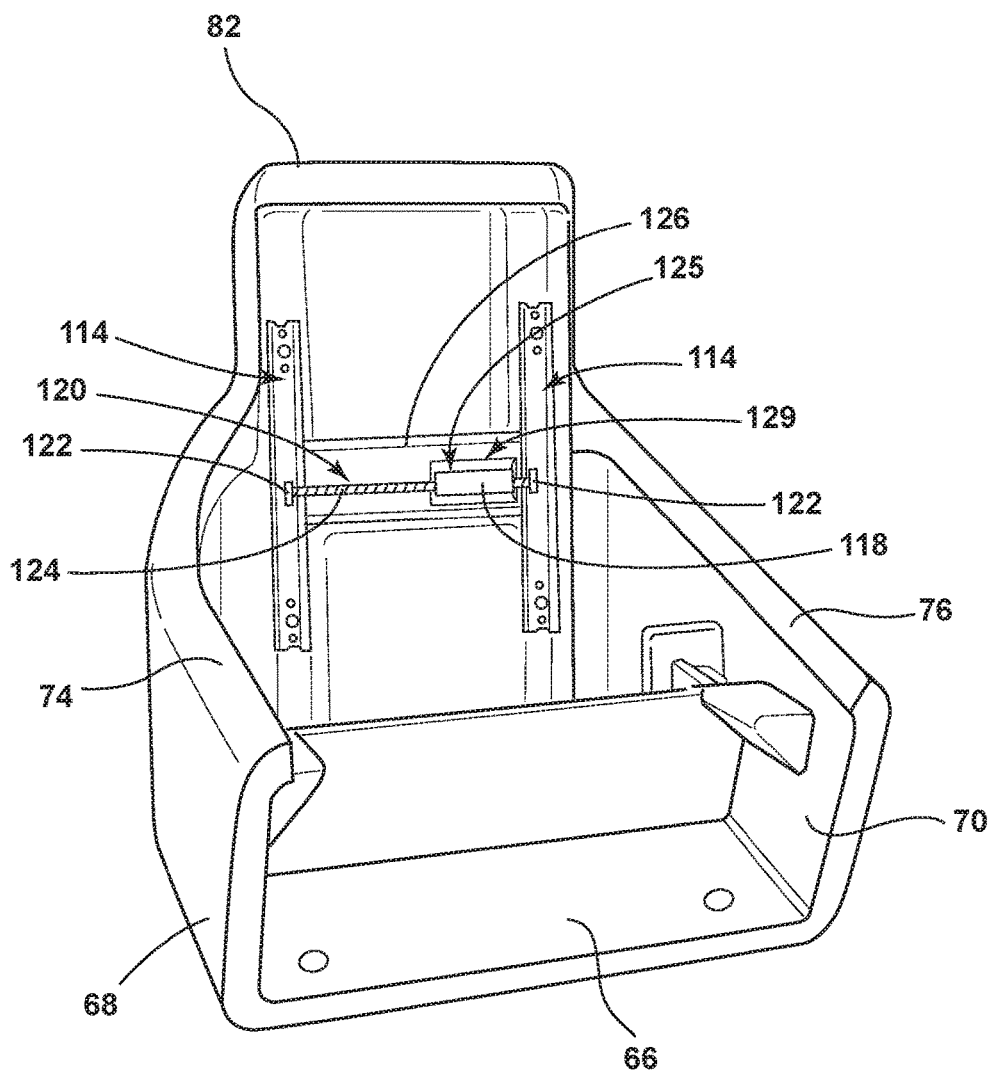
FIG. 7 is a front perspective view of a seat base, according to some examples.
Figure 8:
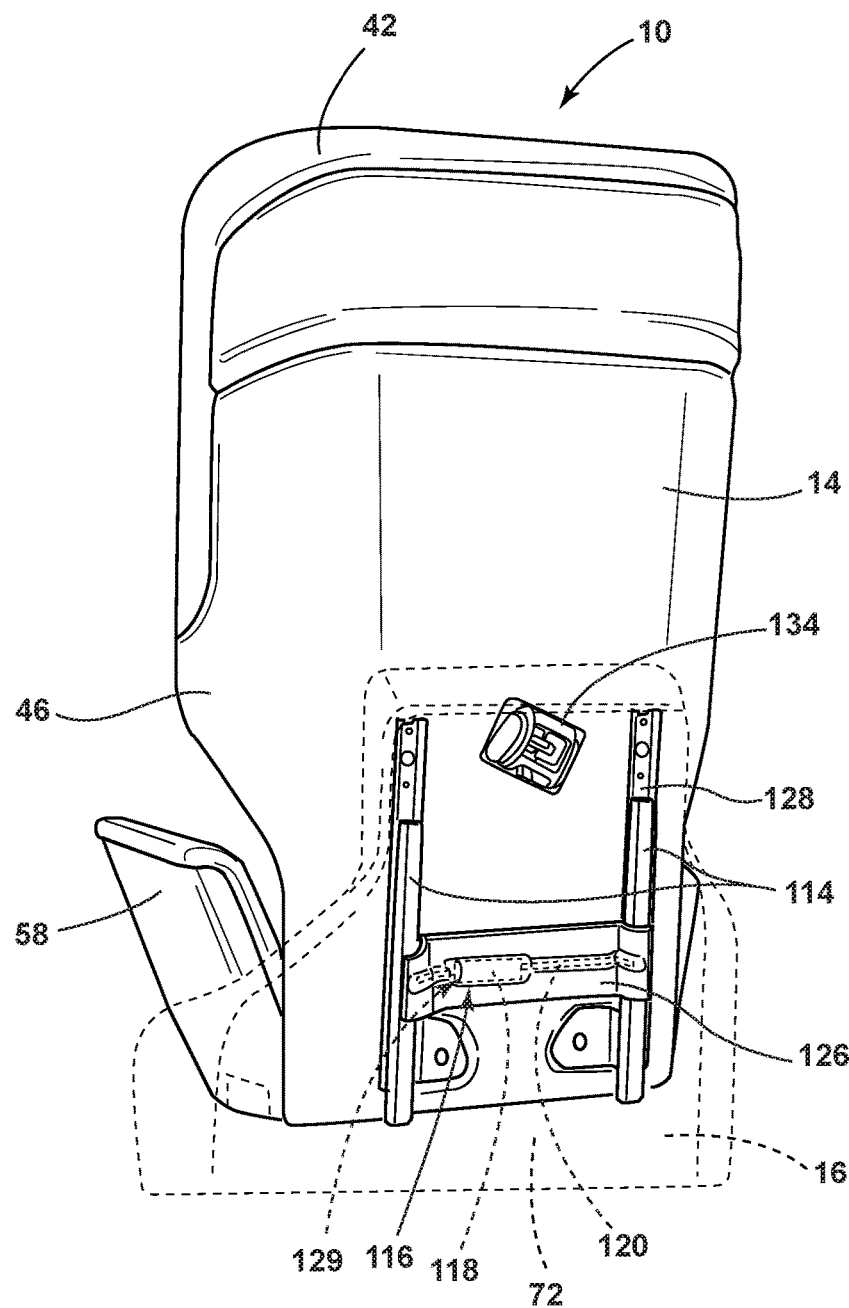
FIG. 8 is a rear perspective view of a seatback and a seat member, according to some examples.

Referring to FIGS. 6-8, the seat adjustment mechanism 100 may include rails 114 mounted to the seat base 16. A power drive unit 116 includes an electric motor 118 and a drivetrain 120 which may include one or more gears 122 that may be operably coupled with a shaft 124 and/or other motion transfer components. The drive unit 116 is shown as being fixed relative to the rails 114, but it is also possible for the some or all of the drivetrain components to be mounted to (or otherwise movable along with) the seatback 14. In the depicted system, the drive unit 116 moves the seatback 14 along the rails 114 by a linear actuator 125 extending along the rails 114. For example, the linear actuator 125 may be a worm gear, a Bowden cable, a slotted tape, a spur gear, etc. that is driven by the drivetrain 120. The seatback 14 includes a pair of linear brackets 128 that extend parallel to the rails 114 and are fixedly mounted on a lower portion of the seatback 14. Accordingly, the seatback 14 is vertically adjustable relative the seat base 16 with the adjustment mechanism 100 concealed by the raised central portion 82 of the seat base 16. It is conceivable that the power drive unit 116 may be alternatively arranged on the seatback 14 and operably coupled with the seat base 16 to provide similar vertical adjustment of the seatback 14 between the upper and lower positions.

According to the example illustrated in FIGS. 7 and 8, the motor 118 is supported by a cross-bracket 126. The motor 118 is further disposed in a cavity 129 defined by the seat base 16. The motor 118 is operably coupled to the controller 108. As provided herein, the controller 108 may raise and/or lower the seatback 14 based on the height of the occupant 22 disposed within the seat assembly 10. For example, the power drive unit 116 may lower the seatback 14 when the position sensor 104 fails to detect the occupant 22 within the seat assembly 10. The seat assembly 10 may lower until the occupant 22 is detected, which may ensure the desired height of the seatback 14 for usage of the safety features disposed within the seat assembly 10. In some examples, each time the occupant 22 exits the vehicle 12, the seat assembly 10 may return to an initial, predefined position. Upon entry of a new occupant 22, the seatback 14 may be adjusted upwardly and/or downwardly from the initial position.

Figure 9:
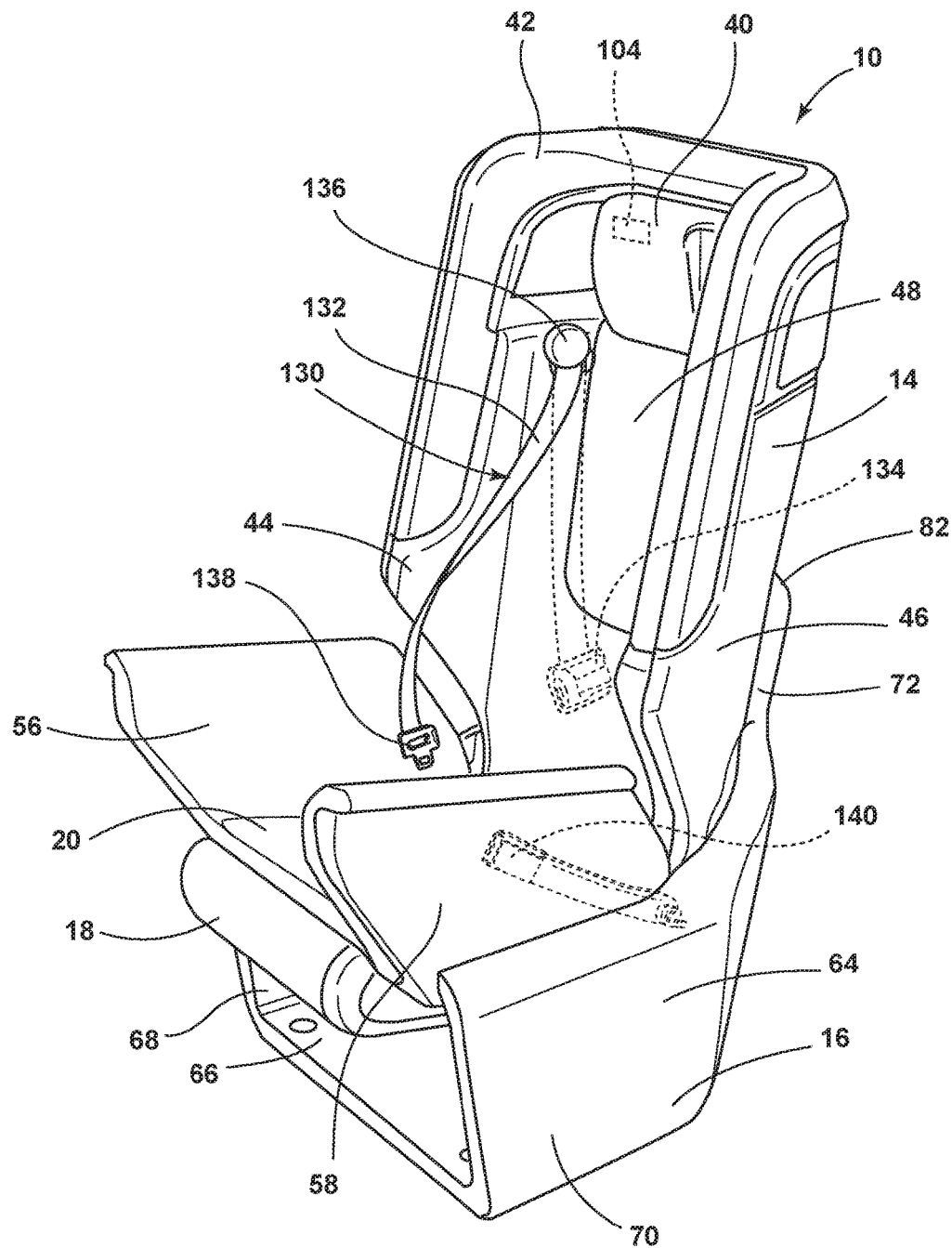
FIG. 9 is a side perspective view of the seat assembly incorporating a seatbelt assembly, according to some examples.

Referring to FIGS. 8 and 9, the seat assembly 10 may also include a seatbelt assembly 130. The seatbelt assembly 130 includes a belt webbing 132 that is coupled to the seat assembly 10 at one end and further coupled to a retractor 134 disposed within the seatback 14 at the opposing end. The retractor 134 may be disposed in a position that, like the adjustment mechanism 100, may be concealed by the raised central portion 82 of the seat base 16. It is contemplated that the belt webbing 132 may be coupled to the seat assembly 10 using a second retractor 134 in a dual retractor system. As coupled to the retractor 134, the belt webbing 132 is retractable, thereby allowing a vehicle occupant 22 to move a seatbelt assembly 130 component for latching the seatbelt assembly 130. It will be appreciated that any other seatbelt orientation may also be utilized within the seat assembly 10 provided herein without departing from the scope of the present disclosure.

In some examples, the belt webbing 132 is coupled to a D-ring 136, or turning loop. The seatbelt assembly 130 further includes a tongue member 138 which is operably coupled to the belt webbing 132 and may be slidable along the belt webbing 132 for adjustable movement therealong. The tongue member 138 is coupled to and slidable along a portion of the belt webbing 132 and configured to releasably couple to a seatbelt buckle 140 for restraining the occupant 22 within the vehicle 12. As provided herein, the seatback 14 is vertically adjustable and may be automatically adjusted based on the height of the occupant 22. Accordingly, the D-ring 136 may be in a desired position in relation to the occupant 22 once the seatback 14 has been moved to accommodate the specific occupant 22 disposed within the seat assembly 10, which may provide additional safety to the occupant 22 of the vehicle 12.

With reference to FIGS. 8-11, as provided herein, the adjustment mechanism 100 and/or seatbelt assembly 130 may be disposed on a rear portion of the seatback 14. The adjustment mechanism 100 is configured to raise and lower the seatback 14, which may be done automatically through detection of an occupant size through the position sensor 104. The automatic adjustment is configured to place the headrest assembly 40 at the height of the head of an occupant 22. However, it will be appreciated that the seatback 14 may be moved to a desired position based on any other reference point without departing from the scope of the present disclosure. The seatbelt assembly 130 includes a retractor 134 that may also be concealed by the seat base 16. The seat assembly 10 may be movable around the vehicle 12 and, as such, each component may be disposed within the seat assembly 10 to provide the features provided herein in any seat assembly position within the vehicle 12.

Use of the present disclosure may offer a variety of advantages. For instance, use of the seat assembly provides for safety features integrated within the seat assembly. The seat assembly may include a seatback that adjusts vertically to accommodate various occupant body types. In the event of a collision event, the generally known placement of the occupant's head relative the seatback helps to ensure that the safety features within the seat assembly perform as intended to best protect the occupant. The seat assembly may be disposed within an autonomous vehicle 12.

According to various examples, a seat assembly is provided herein. A seat base supports a seat member and a seatback. A headrest assembly is disposed within the seatback. A position sensor is disposed within the seatback. An adjustment mechanism operably couples the seatback to the seat base. The seatback is vertically adjusted based on a signal detection from the position sensor. Examples of the seat assembly can include any one or a combination of the following features:

the signal detection is a sensed height of an occupant disposed on the seat member;

the position sensor is disposed in a top portion of the headrest assembly;

the position sensor is configured as an ultrasonic sensor;

an audio system disposed within the seatback;

the audio system includes a pair of speakers disposed on opposing sides of the headrest assembly;

the pair of speakers are disposed within a concave portion of the seatback;

the seatback is adjusted to a position where the position sensor is disposed over an occupant's head;

the pair of speakers are capable of noise control and cancellation;

the adjustment mechanism includes a power drive unit having an electric motor and a drivetrain that includes one or more gears; and/or a seatbelt assembly having a belt webbing coupled to the seat assembly at one end and to a retractor disposed within the seatback at an opposing end.

Moreover, a method of manufacturing a vehicle seat assembly is provided herein. The method includes forming a seat base that supports a seat member and a seatback. A headrest assembly is formed within the seatback. A position sensor is disposed within the seatback. An adjustment mechanism is disposed between the seatback to the seat base. The seatback is configured to be vertically adjusted based on a signal detection from the position sensor.

According to some examples, a seat assembly is provided herein. The seat assembly includes a seat base supporting a seat member and a seatback. A headrest assembly is disposed within the seatback. A position sensor is disposed within the seatback for determining a height of an occupant. A seat sensor determines a presence of the occupant. Examples of the seat assembly can include any one or a combination of the following features:

an adjustment mechanism operably coupling the seatback to the seat base, wherein the seatback is vertically adjusted based on a height of the occupant on the seat member;

a pivotable restraint bar coupled to the seatback having a horizontal portion disposed above the headrest assembly in a first position;

the adjustment mechanism includes a power drive unit having an electric motor and a drivetrain that includes one or more gears; and/or a seatbelt assembly having a belt webbing coupled to the seat assembly at one end and to a retractor disposed within the seatback at an opposing end.

According to other examples, a seat assembly is provided herein. The seat assembly includes a seat base supporting a seatback. A headrest assembly is disposed within the seatback. A position sensor is disposed within the seatback. An adjustment mechanism operably couples the seatback to the seat base. The seatback is vertically adjusted based on a height of the occupant. Examples of the seat assembly can include any one or a combination of the following features:

an audio system disposed within the seatback;

a seatbelt assembly having a belt webbing coupled to the seat assembly at one end and to a retractor disposed within the seatback at an opposing end; and/or the adjustment mechanism is disposed between a raised central portion of the seat base and a bottom portion of the seatback.

It will be understood by one having ordinary skill in the art that construction of the described invention and other components are not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting. It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seat assembly comprising:
a seatback having an inset surface and including left and right seatback bolsters, wherein each of the seatback bolsters has an upper region that extends a first distance from the inset surface, a lower region extending a second distance, and a middle region extending a third distance;
a seat base supporting a seat member and a seatback, wherein the seat base includes a support portion adapted for being mounted to a vehicle floor and includes a wraparound sidewall having side portions and a rear portion including a raised central portion;
a seat member including left and right seat member bolsters, wherein the seat member bolsters extend vertically above the side portions of the wraparound sidewalk;
a headrest assembly disposed within the seatback
a position sensor disposed within the seatback; and
an adjustment mechanism operably coupling the seatback to the seat base, wherein the seatback is vertically adjusted with respect to the raised central portion of the seat base based on a signal detection from the position sensor.

2. The seat assembly of claim 1, wherein the signal detection is a sensed height of an occupant disposed on the seat member.

3. The seat assembly of claim 1, wherein the position sensor is disposed in a top portion of the headrest assembly.

4. The seat assembly of claim 1, further comprising:
an audio system disposed within the seatback.

5. The seat assembly of claim 4, wherein the audio system includes a pair of speakers disposed on opposing sides of the headrest assembly.

6. The seat assembly of claim 5, wherein the pair of speakers are capable of noise control and cancellation.

7. The seat assembly of claim 1, wherein the seatback is adjusted to a position where the position sensor is disposed over an occupant's head.

8. The seat assembly of claim 1, wherein the adjustment mechanism includes a power drive unit having an electric motor and a drivetrain that includes one or more gears.

9. The seat assembly of claim 1, further comprising:
a seatbelt assembly having a belt webbing coupled to the seat assembly at one end and to a retractor disposed within the seatback at an opposing end.

10. A seat assembly comprising:
a seat base supporting a seat member, the seat base including first and second side portions coupled to a rear portion, the rear portion having a raised central portion extending above the side portions;
a seatback including seatback bolsters, wherein an upper region of the seat bolsters extends a first distance from the seat back and a lower region of the seat bolsters extends a second distance, and wherein the first distance is less than the second distance to accommodate the pivotable restraint bar in the first position;
a headrest assembly disposed within the seatback, wherein the seatback is vertically adjustable relative to the seat base;
a pivotable restraint bar pivotally coupled to a seatback and operable between a retracted position above the headrest and abutting the seatback and a second position where the restraint bar is in an extended position and configured to be positioned in front of a seat occupant, wherein the restraint bar is complimentarily accommodated in the left and right seatback bolsters when in the retracted position;
a position sensor disposed within the seatback for determining a height of an occupant; and
a seat sensor for determining a presence of the occupant.

11. The seat assembly of claim 10, further comprising:
an adjustment mechanism operably coupling the seatback to the seat base, wherein the seatback is vertically adjusted based on a height of the occupant on the seat member.

12. The seat assembly of claim 11, wherein the adjustment mechanism includes a power drive unit having an electric motor and a drivetrain that includes one or more gears.

13. The seat assembly of claim 10, wherein the pivotable restraint bar includes a horizontal portion disposed above the headrest assembly in the retracted position.

14. The seat assembly of claim 10, further comprising:
a seatbelt assembly having a belt webbing coupled to the seat assembly at one end and to a retractor disposed within the seatback at an opposing end.

15. A seat assembly comprising:
a seat base supporting a seatback, wherein the seatback includes left and right seatback bolsters;
a headrest assembly disposed within the seatback;
a position sensor disposed within the seatback; and
an adjustment mechanism operably coupling the seatback to the seat base, wherein the seatback is vertically adjusted based on a height of an occupant, wherein the adjustment mechanism is disposed between a raised central portion of the seat base and a bottom portion of the seatback; and
a seatbelt assembly including having a belt webbing coupled to the seat assembly and a retractor positioned between the seatback and the raised central portion of the seat base, wherein the seatbelt assembly is configured to vertically adjust with the seatback based on the height of the occupant.

16. The seat assembly of claim 15, further comprising:
an audio system disposed within the seatback.

17. The seat assembly of claim 1, wherein support portion is planar and adapted to be mounted to a track assembly of the vehicle.

18. The seat assembly of claim 17, wherein the wraparound sidewall extends upwardly from the support portion and above a bottom portion of the seat member, and wherein the wraparound sidewall includes first and second side portions.

19. The seat assembly of claim 1, wherein the raised central portion extends upwardly and above the first and second side portions.

* * * * *